E. B. KIRBY.
CONCENTRATING TABLE.
APPLICATION FILED APR. 20, 1903.

1,105,912.

Patented Aug. 4, 1914.
4 SHEETS—SHEET 4.

Witnesses.
E. B. Gilchrist
N. L. Bresnan

Inventor:
Edmund B. Kirby,
By his Attorneys,
Thurston & Bates

UNITED STATES PATENT OFFICE.

EDMUND B. KIRBY, OF ROSSLAND, BRITISH COLUMBIA, CANADA.

CONCENTRATING-TABLE.

1,105,912. Specification of Letters Patent. Patented Aug. 4, 1914.

Application filed April 20, 1903. Serial No. 153,562.

*To all whom it may concern:*

Be it known that I, EDMUND B. KIRBY, a citizen of the United States, residing at Rossland, in the Province of British Columbia, Canada, have invented a certain new and useful Improvement in Concentrating-Tables, of which the following is a full, clear, and exact description, reference being had to the accompanying drawings.

This invention relates to a general class of concentrating machines which are widely used in mining operations for separating the mineral or valuable portion of ore from the worthless portion or gangue. The ore, crushed so as to break it up into particles, is subjected, in the particular machines to which my invention applies, to two forces, one operating primarily on the heavy particles and the other on the light particles. Such a machine is best embodied in a table which is given a longitudinal shake or bump more sudden in one direction than the other, and also is subjected to the action of wash water in a lateral direction. The effect of the bump or unequal shake is not only to keep the particles from packing, but to settle the heavier particles down to the lower part of the layer and hence nearer to the table and cause such heavier particles to travel along the surface more rapidly than the lighter particles, while the effect of the wash water is to carry the lighter particles crosswise of the table. The tendency of the heavier particles is thus to travel longitudinally and of the lighter particles to travel laterally and the result is that the particles take a diagonal direction and gradually become separated into lines of consecutively varying specific gravity and richness. Familiar instances of such a table are the Wilfley concentrating table, the Cammet table, the Overstrom table, and the Rittinger table. The present invention is not limited to any particular design of table. It is shown herein as applied to a table of the Wilfley type. In all concentrating tables, with which I am familiar, as the belt of concentrate travels in the diagonal direction, the heaviest particles, which are nearest to the wash water, shield the lighter particles behind them from the action of the wash water so that these lighter particles tend to mix with the heavier particles, and to overcome this the belt of concentrate must be subjected to the action of the wash water a much longer time than is desirable. The material arranging itself into strips or bands, as stated, presents a band of the heaviest material acted upon nearest to the force of wash water and the next band of material of lighter gravity directly behind it. However, there will not be a clear line of division between the bands, but the second band will overlap the first to a greater or less extent and in the final separation of the material, this underlap of the first band goes with the second band and represents a loss. With this general statement of facts it may be said that my invention has a main object consisting of two parts. In the first instance, the object is to remove a portion of the foremost band of concentrates and subject the front wall of the remaining material to the action of the wash water. In practice, the material comprising the foremost band is removed as near to the second band as is feasible and thereby exposes the lapping portions of the two bands. The wash water acting upon the material immediately rearranges the same so that a new band of heavy material is formed, and as in the previous case there will be a lapping of the bands of heavy material and the band adjacent thereto, but the lapping is not so great as before. The front band may be successively removed and the remaining material successively subjected to the wash water, and in this manner progressively smaller portions of the heavier valuable material underlap so that in the final discharge over the tail of the table a very small portion of the valuable material is lost due to the lapping. In the Wilfley table, for example, a portion of the surface is covered by riffles formed of the strips of wood placed lengthwise of the table, or crosswise of the stream of wash water, and each tapering downward toward the right so as to gradually merge in the remaining portion of the table. As the mineral particles traveling from left to right and by degrees gaining on the waste particles, gradually leave the protection of the riffles and crawl out upon the smooth surface, they are subjected more and more to the sweeping action of the wash water, and this stream of water not only finally separates the waste from the mineral particles, as intended, but also tends to force the mineral particles down the inclined plane of the table so that many of the valuable particles are washed away. In order for the wash water to purify the concentrates on the whole table therefor, there is a continually destructive action to the concentrates the more they are exposed to the wash water.

Therefore it is an object of my invention to prevent loss in this way by providing means for the successive discharge of concentrates as rapidly as they are separated, thus making it unnecessary for them to remain under the dangerous action of the wash water any longer than is really necessary. I do this by placing one or more discharge holes in suitable positions along the line of concentrates, through which the latter may fall and be suitably conveyed to the concentrates box. I prefer to receive the concentrates in a trough which may very conveniently be adjusted to the under side of the table and vibrate with it.

Subsidiary portions of this improvement are the arranging of the openings in groups to separate different grades of concentrates; adjusting the position of the division end of the openings; and the particular means employed for adjusting such opening.

The reason for adjusting the division end of the openings is that in operation there are certain non-controllable variable factors, as the quantity of ore delivered per minute, the average sizes of grains, the range of sizes, the percentage of concentrates, the proportions of the various minerals composing these concentrates, etc., and these non-controllable factors operate to shift the path of the band of concentrates upwardly and downwardly on the table. The non-controllable factors are compensated for by adjusting the controllable factors, among which are the position of the operative portion of the opening; the force of the wash water; the pitch of the slope; the shake of the table, (in the sharpness of stroke, the length of stroke, or the number of strokes)—all tables having some means of controlling this factor.

This invention includes the combination with the intermediate discharge openings of any means for controlling one or more of the controllable factors to compensate for the change of positions which the non-controllable factors tend to cause, thus dividing the concentrates as desired.

A second main improvement of this invention consists in locally varying the wash water according to the conditions of the table so that the concentrates between the successive openings shall receive just the proper force of wash water. Subsidiary portions of this improvement are the dividing of the table into sections, so that there shall be little wash water immediately following a discharge opening, allowing the concentrates to spread out longitudinally, and then a large amount of wash water to purify them. An arrangement of branch pipes and valves for controlling this local adjustment of the wash water, are comprehended within this portion of the invention.

A third main improvement of this invention consists in warping the surface of the table so that the portion of the table concerned with the beginning of the operation, where the settling is desired, shall be nearly flat, but toward the discharge end the table shall gradually increase in pitch to subject the concentrates to a severer action of the wash water. The means for providing this warping vary with the construction of the concentrating table to which my improvements are applied. In the Wilfley table, for instance, I provide this warping by adjusting the wedges which operate along the free edge of the table to raise that edge, as desired. This adjustable means is a subsidiary portion of this improvement.

The various improvements referred to are clearly illustrated in the drawings, which show them as applied to a Wilfley table.

Figs. 3 to 6, inclusive, represent the preferred form of adjusting the discharge opening; Fig. 9 is a right hand end elevation. The incline shown in Figs. 8 and 9 is somewhat distorted to indicate more clearly the warped surface.

The table proper is represented by A. It consists of a large surface shown as covered by linoleum $a^6$, and having upon it, extended in parallel manner from the left hand end, the riffles $a$, which extend continuously farther and gradually decrease in height to merge at their right hand ends with the flat surface of the table. This table A is mounted so as to be capable of longitudinal movement on suitable supporting cross beams B. This mounting is shown as being by rollers $a'$. The beams B are hinged at $b$ parallel with the back edge of the table, while at their front ends the beams are supported by wedges C. These wedges are movable upon the foundation D by means of a lever $c'$, to which they are connected by a link $c^2$. The wedges thus operate to hold the table in an inclined position. The wedges are secured to the link $c^2$ by bolts $c^3$ taking through slots in the link, which allows the wedges to be individually adjusted so as to raise the front right hand corner of the table more than the left hand corner, giving it the warped surface desired. The amount of the warp is regulated by this adjustment of the wedges. The crushed ore and gangue is delivered in a continuous stream with a large amount of water to the left hand portion of the table through a suitable trough E. All the heavier part of the ore and gangue settles in the riffles, but the lightest part of it is at once washed over the rear edge of the table by the continually flowing stream from the trough. The table is moved back and forth longitudinally, but more suddenly or rapidly toward the right than toward the left. Any suitable mechanism may be employed for doing this,— none being shown, as such mechanisms are common and well known in the art. This unequal shake of the table toward the right causes the particles to travel in that direction between the riffles. As they progress toward the right, the riffles, decreasing in height, make less of a barrier for the light particles, and these light particles are again carried off over the back edge of the table,— the particles which are thus carried off being continuously heavier toward the right hand end of the table. Extending along the front edge of the smooth portion of the table and suspended above it is a pipe F receiving water and arranged to distribute it over the smooth surface of the table and over the right hand portion of the riffled surface to purify the material. Now, as the material, which is caught between the riffles, travels to the right and then gradually is forced over the riffles, some of it clear over the edge of the table, other and heavier particles being again caught and again traveling to the right, and so on in a step-wise movement, the comparatively heavy particles eventually all emerge on the smooth surface of the table, and tend, under the two forces of the wash water and shake, to take a diverging diagonal path toward the lower right hand corner of the table. The front edge of this stream of concentrates, as they are called, is the heaviest or very richest. In operations upon gold ore it may be a stream of pure metallic gold; next behind this comes a stream of less rich ore, and so on,—the band becoming less rich in concentrates until it merges into what are known as middlings; and the rear edge of the middlings stream merges into the waste. A concentrates box (not shown) is placed at the right hand corner of the table, and the incline of the table, its longitudinal shake and the wash water are so adjusted that the concentrates pass into this box, and the middlings into a box or trough L behind it, and the waste behind it. Now to save the pure concentrates from action by the wash water any longer than necessary, I provide, as heretofore stated, one or more discharge holes in the table in advance of the extreme discharge, so that as soon as a reasonable portion of the concentrates have been purified they drop through the table, and the exhausted residue is submitted to the action of the wash water, to be again treated in like manner. This operation on the successively exhausted residue is as heretofore stated one of the main features of this invention.

Figure 1:
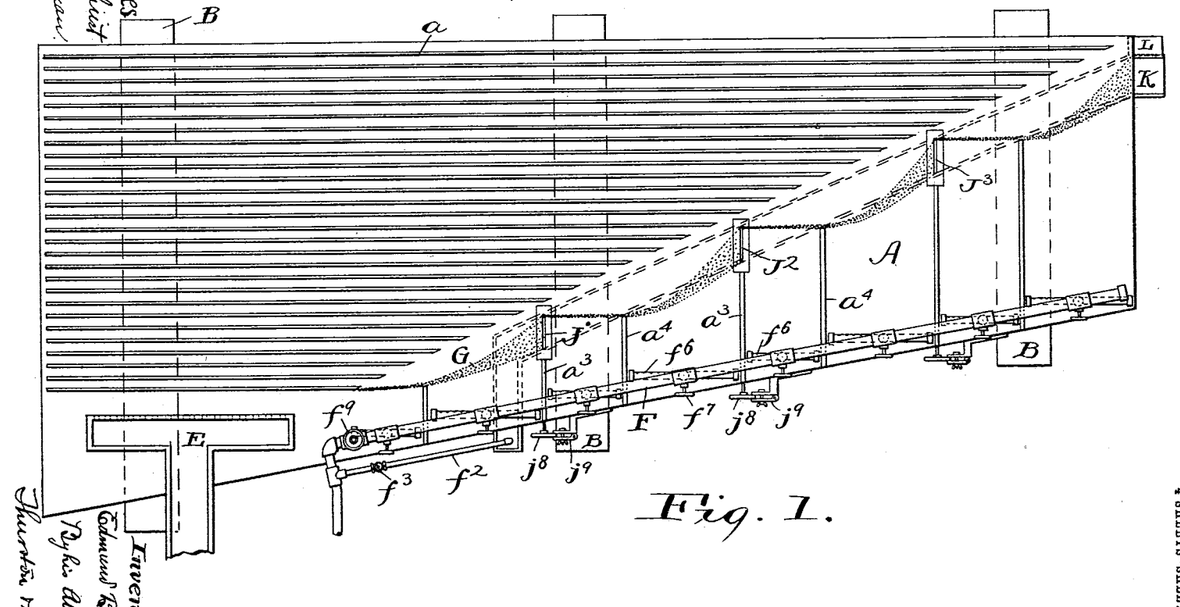
Figure 1 is a plan of such table embodying the features of several adjustable discharge openings and the wash water acting in sections and individually adjustable.
Figure 2:
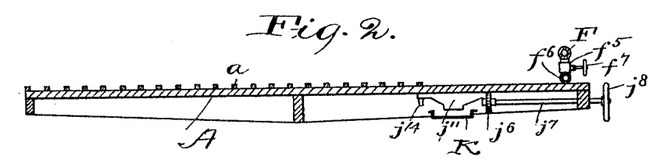
Fig. 2 is a transverse section of such table.

As shown in Fig. 1, the separated concentrates, indicated by G, travel diagonally downward along the front edge of the riffles, passing first over the opening J', and drop through this opening into a trough K beneath the same. The partly exhausted residue of ore grains passing below this opening passes on, together with the accession thereto coming from the riffles farther down the table, and the additional concentrates separated therefrom pass across another opening, as $J^2$, through which they drop into the trough K. Then the further exhausted residue, with its accretions, again passes on, and its separated concentrates may pass through another opening, as $J^3$. This last exhausted residue, which passes below $J^3$ is again separated, and divided at the edge of table into the last remnant of concentrates also middlings and waste, and the middlings are in one position and the waste in another. The middlings are shown as passing over the right hand edge of the table next to the concentrates stream.

This arrangement results in a great saving of the valuable particles of the ore. As soon as any valuable particles are separated they at once pass to a place of safety, while under the old arrangement they were forced to run the gauntlet of many feet of wash water with the result that a greater or less portion thereof was invariably carried over with the waste.

Figure 7:
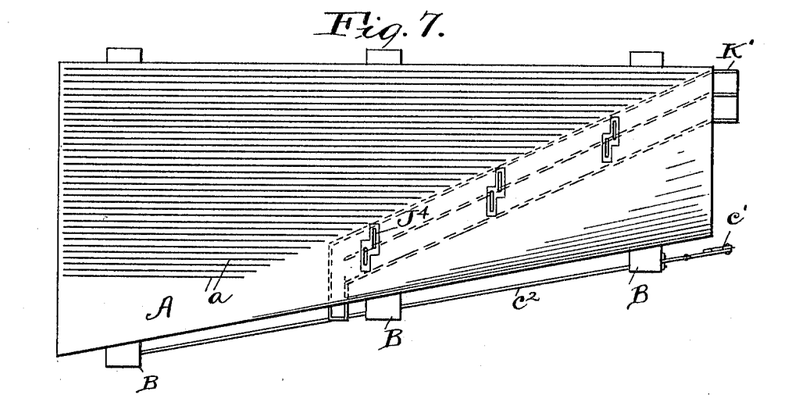
Fig. 7 is a plan of the table illustrating the warped surface and the grouping of the discharge holes.
Figure 8:
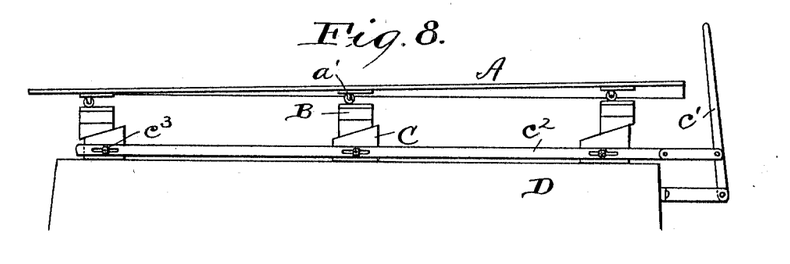
Fig. 8 is a front elevation of the table.
Figure 9:
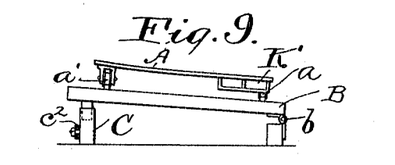

If it is desirable to separate the valuable concentrates into two or more grades, this may be done by providing groups of openings, as indicated by $J^4$ on Fig. 7, each opening of the group being, of course, controlled by its own valve,—the openings being properly spaced to permit the duplication of these valves. The trough K below these openings is divided, the front half thereof discharging richer concentrates than the rear half. This division of the valuable concentrates may be extended to any refinement desired.

Figure 3:
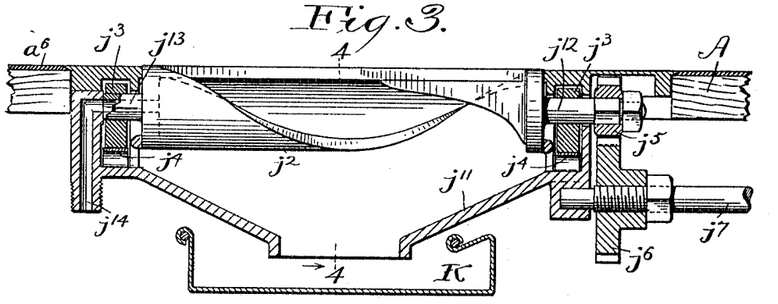
Fig. 3 being a vertical section lengthwise of the opening.
Figure 4:
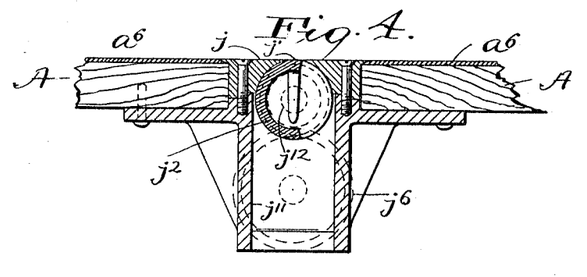
Fig. 4 a cross section on the line 4—4 of Fig. 3.
Figure 5:
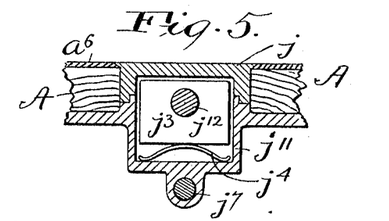
Fig. 5 a cross section through the bearing.
Figure 6:
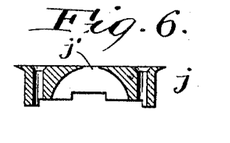
Fig. 6 a cross section through the housing plate around the opening.
Figure 10:
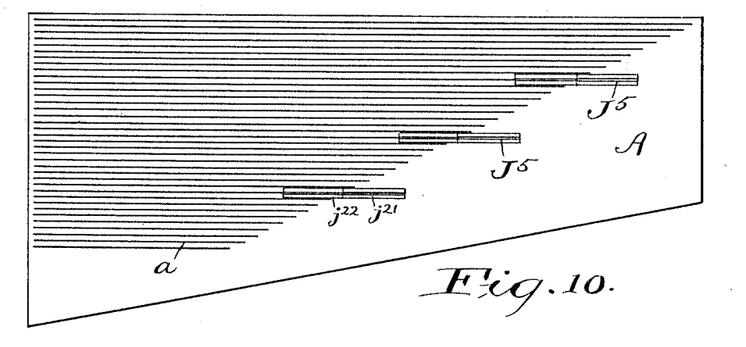
Fig. 10 is a diagrammatic plan of the table with the discharge openings longitudinal instead of transverse.
Figure 11:
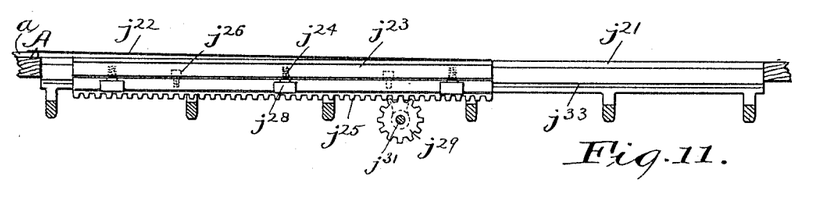
Fig. 11 is a longitudinal section through the table, illustrating the means for closing such openings, as shown in Fig. 10.
Figure 12:
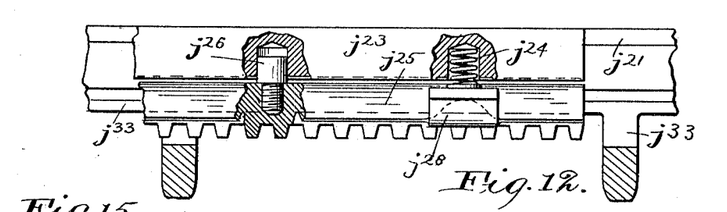
Fig. 12 is an enlarged view of a portion of the mechanism shown in Fig. 11.
Figures 13, 14, 15:
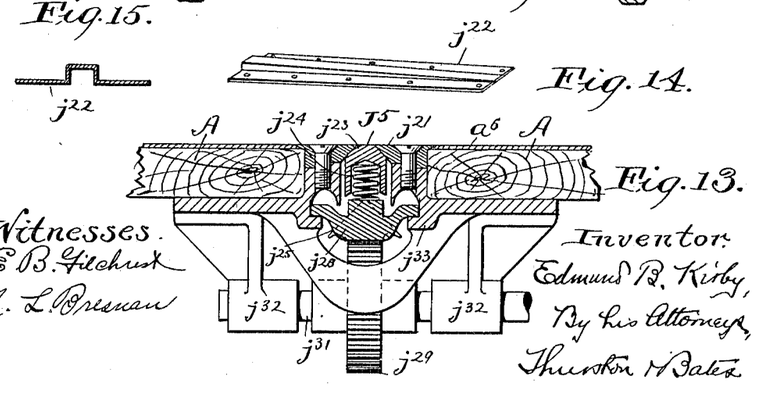
Fig. 13 is a cross section through the table showing this closing mechanism.
Fig. 14 is a perspective view of the metal end of the riffles opposite the discharge openings.
Fig. 15 is a cross section of such metal end piece.

Now, to attain the best results with my openings, it is necessary to govern the portion of the concentrates passing into the same with reference to the grade of ore, because the division line or lines between the concentrates and other grades of material tends to vary its position from time to time. I do this in the present invention by either one of two methods; first, by having openings in a fixed position and holding the division line steady to suit position of openings by adjusting the slope or quantity of wash water, or sharpness of stroke or length of stroke, or number of strokes per minute,—all tables being provided with mechanical means for making one or more of these adjustments. Secondly, I may accomplish this by allowing division line to vary and shifting the position of the division end of each opening to correspond. I show herewith two kinds of such adjustable openings. For instance: Fig. 10 shows the openings lengthwise, as $J^5$, while in the other figures they are crosswise. In either case, I have provided beneath the opening adjustable means for partly closing it, so as to shift the division end of the opening according to the position of the division line, this position changing with the quantity of ore per minute, the average size of grains, the range of grain sizes, the percentage of concentrates, the proportions of the various minerals composing these concentrates, etc., etc. One adjustable means for shifting the division end of an opening in the table consists of a suitable gate movable beneath that opening. Figs. 3 to 6, illustrate the mechanism where the gate is rotatable; Figs. 11 to 13 illustrate it where the gate is longitudinally slidable. Referring, first, to Figs. 3 to 6, inclusive, the opening in the table A is bounded by the housing plate $j$, having through it a rectangular opening $j'$, and having on its under side a concave surface. Beneath this concave surface is a cylinder $j^2$ provided with a spiral edge and having axles $j^{12}$, $j^{13}$ journaled in blocks $j^3$ loosely carried in the housing $j^{11}$ beneath the table. These blocks $j^3$ are pressed upward by springs $j^4$ to cause the cylinder to substantially engage the concave surface of the housing plate at all times, but to yield downward if necessary as small particles of material may work in between it and the plate. It will be readily seen that as the cylinder $j^2$ is turned on its axis the opening $j^1$ is gradually closed. Figs. 3 and 4 show it entirely closed. Now, if the cylinder be rotated in a left hand direction the opening will be gradually unclosed from its front end until, when the cylinder has been rotated a little less than all the way around, the opening will be entirely open. The means for rotating the cylinder which I have employed, consists of a pinion $j^5$ on the shaft of the cylinder meshing with the gear $j^6$ on a shaft $j^7$ which extends to the front of the table and there receives a hand wheel $j^8$, Figs. 1 and 2. Fig. 1 also shows a clamp $j^9$ for locking the hand wheel in adjusted position. The lower portion of the housing $j^{11}$ is formed into a hopper-like structure which receives the material dropping through the cylinder and discharges it onto the trough K. This trough may be of sheet metal and be hung by suitable means to the under side of the table. In order to insure the discharge of all the concentrates which enter the cylinder, I prefer to make the rear axle $j^{13}$ thereof hollow, and I provide a passage-way $j^{14}$ in the housing $j^{11}$ communicating therewith. A hose, communicating with this passage-way, conveys water therefor to the interior of the cylinder to flush it out. This water, together with water entering the upper end of the trough K through a pipe $f^2$ (governed by a valve $f^3$) causes the concentrates passing through any of the discharge openings in the table to travel along the trough K and be delivered at the end thereof.

Another adjustable opening is shown in the construction illustrated by Figs. 10 to 15 inclusive, the openings $J^5$ are longitudinal. They are likewise made in a housing plate $j^{21}$, which alines with the end of a metal riffle $j^{22}$. This metal riffle bridges an opening through the table of the same width as the opening $J^5$, and its higher end merges with the ordinary wooden riffle $a$ of the table. The metal riffle is used so as to leave an opening beneath it. Into this opening the gate $j^{23}$ is adapted to travel to unclose the opening. This gate is pressed upward into place by springs $j^{24}$ which rest upon a slidable rack bar $j^{25}$, which has arms $j^{28}$ slidable on ledges on the housing $j^{33}$. This housing extends lengthwise approximately twice the length of the gate $j^{25}$, the left hand half of the housing being under the riffle plate $j^{22}$. The gate is held to the rack bar by pins $j^{26}$ carried by the rack bar and extending into openings in the gate. This causes the gate to travel with the rack bar, but allows it to adjust itself yieldingly to the housing plate $j^{21}$. Meshing with the rack bar is a pinion $j^{29}$ on a shaft $j^{31}$ journaled in suitable bearings $j^{32}$ carried by the housing $j^{33}$. This shaft $j^{31}$ can be rotated in any suitable manner, as by a hand wheel, wherefore the gate is shifted to uncover the opening, as desired. When the gate uncovers the opening, it travels toward the left hand end of the table passing beneath the metal end $j^{22}$ of the riffle.

It will be seen from the above description that either in the form of adjustment shown in Figs. 3 to 6 or in Figs. 11 to 13, a simple rotation of the hand wheel varies the discharge opening, the hand wheel being thereafter locked by any suitable means, as the clamp $j^{0}$.

The first part of the operation of the table is mainly a settling operation to allow the heavier particles to descend between the riffles, while the later part is mainly a separating operation. Inasmuch as there is generally a large quantity of water with the material coming through the trough E, I make the table very flat at this point to give the material time to settle. As the material progresses to the other end of the table, the operation becomes more and more one of separation, and as the material on the table is thus continually heavier toward the right and hence has more of a tendency to travel in a path continually approaching a line parallel with the riffles, I counteract this by making the table continuously steeper to the right, thus giving a warped surface. Since this warp is gradual it gives a gradually increasing slope for each successive operation, which has a particular advantage, owing to the fact that each section now operates upon the exhausted residue of the preceding section due to my intermediate discharge openings. It is to be noted that the amount of warping of the surface, and the amount of general incline given to it, is very slight, being exaggerated herein for the purposes of illustration. Now as the portions of the table nearest the discharge end need the strongest current in the wash water as the particles are heavier, I provide means for locally regulating the flow of the wash water according to the section of the table which it feeds. I accomplish this by extending downward from the main wash water pipe F short sections $f^5$ in which are placed valves $f^7$ and below the valves are branch pipes $f^6$. Each branch $f^6$ may thus be independently regulated according to the local requirements. The whole main pipe F is regulated by the main valve $f^9$. Now as the exhausted residue of concentrates, after a portion has been removed by dropping through one of the openings, should be given opportunity to spread out so that the heavy and rich particles will not be washed away with the lighter ones, I arrange the wash water immediately following each opening so that it shall be very slight in flow, being preferable just enough to keep the material wet. This allows the material to travel out longitudinally of the table, the heavy particles gaining on the light particles under the influence of the shake. Then, before the next discharge opening is reached, the concentrates encounter wash water coming in greater force from another branch $f^6$, which washes away the light particles and gives to the band of concentrates a diagonally downward direction causing them to pass over the next opening through which the rich portion drops, after this the residue may again encounter first, a slight flow of water and then a large force thereof. This sectional operation may be facilitated by dividing the table into physical sections by transverse slats on the table surface, as $a^3$ $a^4$. Of these slats $a^3$ are directly opposite the discharge openings and $a^4$ are intermediate. Another mode of washing so as to spread out the partly exhausted residue before separating it by the full strength of wash water is to graduate the strength of wash water over the limits of each section between discharge points so that it is very weak at the beginning and of full strength at the end. This may be effected by a large number of small valves adjusted to this end or by having a single branch pipe over each section with discharge apertures in the pipe of graded size increasing toward the end of the section.

By regulating the position of the division end of the discharge opening or by varying the force of the wash water or the other factors which tend to drive the concentrates rearward, I can make just that portion of the belt of concentrates which is of the desired richness pass over and drop into a discharge opening. The successive adjustable discharge openings, the regulated sectionally operating wash water, and the warp of the table all coöperate to produce a separation and concentration of the ore which is far in advance of anything heretofore devised with which I am familiar, and which is well nigh perfect, resulting in saving substantially all the valuable portions of the ore.

Having described my invention, I claim:

1. A concentrating table having a separating portion which is free of riffles, combined with means for imparting differential lengthwise vibration to said table, and means for delivering a forceful sheet of wash water onto said table in a direction which is transverse to the direction of vibration, and is toward the rear side of said table, and means for removing the unlapped part of the front band, said means being located at a point such that after the stated part of said band has been removed the wash water acting on the newly exposed front edge of said banded material will sweep back the overlapping part of the second band and expose a greater part of the remainder of the front band.

2. A concentrating table having a separating portion which is flat and free of riffles, means for differentially vibrating the table in one direction, and means for discharging a forceful sheet of wash water onto said table in a direction which is transverse to the direction of vibration and is toward the rear side of said table, said table having through it a plurality of slots whose rear ends are progressively nearer the rear edge of the table as they are nearer the delivery end thereof, and said slots being in the path of the unlapped part only of the front band, and there being a sufficient distance between said slots to permit the rebanding of the material by the action of the wash water while said material is traveling the distance between said slots.

3. A concentrating table having a separating portion which is free of riffles, means for differentially vibrating the table in one direction, and means for discharging a forceful sheet of wash water onto said table in a direction which is transverse to the direction of vibration and is toward the rear side of said table, said table having through it a plurality of slots whose rear ends are progressively nearer the rear edge of the table as they are near the delivery end thereof, and said slots being in the path of the unlapped part only of the front band, and there being a sufficient distance between said slots to permit the rebanding of the material by the action of the wash water while said material is traveling the distance between the slots, and means for varying the position of the rear ends of said slots.

4. A vibrating concentrating table having a wash water supply and a separating portion wherein the previously settled mineral is divided into bands, said separating portion being provided with successive groups of discharge openings on that side of the path of movement of the mineral nearest the wash water supply, one of the members of each group being advanced somewhat nearer than the rest of the group toward the wash water supply, each opening having a means for controlling the entrance of mineral thereto.

5. A concentrating table having an opening in it, a cylindrical gate for partially closing said opening, a spring for yieldingly holding said gate beneath the opning, and means for moving said gate.

6. A concentrating table, having an opening in it, a cylindrical gate beneath the opening for partially closing it, one or more springs yieldingly holding said gate, a rotatable shaft, and a gear connection between the same and said gate, all of said parts being carried by the table.

7. A concentrating table having an opening in it, and a member having a spirally disposed edge for controlling the position of that end of the opening which is within the concentrate band.

8. A concentrating table having an opening in it, a rotatable member having a spirally disposed edge for controlling the size of said opening, and a rotatable shaft for turning said member.

9. A concentrating table, having an opening in it, a housing surrounding said opening and having a concave under surface, a rotatable member having a spirally disposed edge spring-pressed against said surface, and means for rotating said member.

10. A concentrating table, having an opening in it, a housing surrounding said opening, bearing blocks loosely carried by said housing, a member having a spirally disposed edge journaled in said bearing blocks, springs beneath said bearing blocks tending to elevate the member, and means for rotating said member.

11. A concentrating table, having an opening in it, a housing carried by said table beneath said opening, said housing having a plate which forms the border of the opening, the under side of said plate being concave, a member having a spirally disposed edge carried by said housing, springs forcing said scroll toward said concave surface, and a rotatable shaft connected with said member.

12. A concentrating table, having an opening in it, a housing plate surrounding said opening being concave on its under side, a housing beneath said plate, bearing blocks in said housing, a spiral edged gate journaled in said bearing blocks, springs acting on said blocks to yieldingly hold the gate against the concave surface, one of the journals of the gate being hollow, a passageway in the housing communicating therewith, and a rotatable shaft connected with the other journal of the gate.

13. In a concentrating table, the combination of a table having on its upper surface longitudinal riffles and cross slats to divide it into different sections, a system of wash water piping, and means for radiating it for the different sections of the table.

14. In combination with a vibrating concentrating table, means for discharging a forceful sheet of wash water onto said table in a direction transverse to the direction of vibration of the table, said table being provided with openings in it, cross slats carried by the table substantially in line with the openings, and means for independently regulating the wash water within the sections defined by said slots.

15. In a concentrating table, the combination of a table having openings in it, cross slats on the upper surface of the table terminating substantially at said openings, intermediate slats between the cross slats, said slats dividing the table into two sections between the openings, a system of wash water piping, and means for governing the flow therefrom locally for each of said sections.

In testimony whereof, I hereunto affix my signature in the presence of two witnesses.

EDMUND B. KIRBY.

Witnesses:
C. W. JENKINS,
H. J. DARBY.